(12) United States Patent
Yamamoto et al.

(10) Patent No.: US 9,758,050 B2
(45) Date of Patent: Sep. 12, 2017

(54) DISPLAY SYSTEM FOR ELECTRICALLY POWERED VEHICLE AND ELECTRICALLY POWERED VEHICLE HAVING THE SAME

(75) Inventors: Masaya Yamamoto, Kasugai (JP); Itaru Seta, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 766 days.

(21) Appl. No.: 13/614,636

(22) Filed: Sep. 13, 2012

(65) Prior Publication Data
US 2013/0009764 A1    Jan. 10, 2013

Related U.S. Application Data

(63) Continuation of application No. PCT/JP2010/068066, filed on Oct. 14, 2010.

(51) Int. Cl.
*B60Q 1/00*       (2006.01)
*B60L 11/18*      (2006.01)

(52) U.S. Cl.
CPC ..... *B60L 11/1861* (2013.01); *B60L 2240/545* (2013.01); *B60L 2250/16* (2013.01); *Y02T 10/7005* (2013.01); *Y02T 10/705* (2013.01); *Y02T 10/7044* (2013.01)

(58) Field of Classification Search
USPC .................. 340/438, 449, 635, 636.1–636.13
See application file for complete search history.

(56) References Cited

U.S. PATENT DOCUMENTS 5,043,651 A * 8/1991 Tamura .......................... 320/136
5,734,099 A 3/1998 Saigo et al.
6,127,806 A 10/2000 Tanjo et al.
2009/0184578 A1* 7/2009 Owens ......................... 307/10.7
2010/0106351 A1 4/2010 Hanssen et al.
2011/0032110 A1* 2/2011 Taguchi ..................... 340/636.1

FOREIGN PATENT DOCUMENTS

| JP | A-05-130709 | 5/1993 |
| JP | A-09-191505 | 7/1997 |
| JP | A-11-326472 | 11/1999 |
| JP | A-2008-051750 | 3/2008 |
| JP | A-2008-537528 | 9/2008 |
| JP | A-2010-011523 | 1/2010 |
| JP | A-2010-142026 | 6/2010 |

OTHER PUBLICATIONS

Nov. 16, 2010 International Search Report issued in International Patent Application No. PCT/JP2010/068066.

* cited by examiner

*Primary Examiner* — Brian Zimmerman
*Assistant Examiner* — Thomas McCormack
(74) *Attorney, Agent, or Firm* — Oliff PLC

(57) ABSTRACT

An SOC display displayed on a display includes a first region and a second region. The first region presents an SOC range capable of ensuring the minimum traveling performance. The SOC display displays an SOC within the first region. The second region presents an SOC range incapable of ensuring the minimum traveling performance. The boundary between the first region and the second region corresponds to an SOC lower limit value indicating the SOC lower limit capable of ensuring the minimum traveling performance. The SOC lower limit value is set based on the temperature of a power storage device.

7 Claims, 5 Drawing Sheets

DISPLAY SYSTEM FOR ELECTRICALLY POWERED VEHICLE AND ELECTRICALLY POWERED VEHICLE HAVING THE SAME

This is a Continuation of PCT Application No. PCT/JP2010/068066 filed Oct. 14, 2010. The entire contents of which are hereby incorporated by reference.

BACKGROUND OF THE INVENTION

Field of the Invention

The present invention relates to a display system for an electrically powered vehicle and an electrically powered vehicle having the same. In particular, the present invention relates to a display system for an electrically powered vehicle equipped with a power storage device storing electric power for the vehicle to travel and to an electrically powered vehicle having the same.

Description of the Background Art

Japanese Patent Laying-Open No. 5-130709 discloses a battery-voltage-adaptive electric vehicle controller. With this controller, based on a detected value of a battery voltage, the maximum speed and maximum torque at which the vehicle can travel are calculated. The calculated maximum speed and maximum torque are displayed on a speed indicator and a torque indicator, respectively. Consequently, a driver is notified of the current performance of the electric vehicle.

It is described that this controller enables the driver to determine the performance the electric vehicle can output, and therefore, it is possible to encourage the driver to drive safely according to that performance.

SUMMARY OF THE INVENTION

The electric power that a power storage device can output varies depending on a state of the power storage device (temperature, a state of charge (hereinafter also referred to as "SOC" and expressed as a percentage to the capacity of power storage device 10) and the like). Accordingly, in the case of an electric vehicle in which a motor is a sole power source or in the case where a hybrid vehicle uses only a motor to travel, the traveling performance of the vehicle varies depending on the state of the power storage device. It is desirable that such variations (particularly decrease) in traveling performance be made available to a user, to the extent that does not give a negative impression to the user.

In this respect, the technology disclosed in the above-indicated publication is useful in that it displays the maximum speed and maximum torque at which the vehicle can travel, thereby notifying a user of variations in traveling performance. However, the technology disclosed in the above-indicated publication is to make the current traveling performance according to a battery voltage available to a user, rather than to provide a user with information that enables the user to predict a decrease in traveling performance.

Therefore, an object of the present invention is to provide a display system for an electrically powered vehicle which provides a user with information that enables the user to predict a decrease in traveling performance, as well as an electrically powered vehicle with the same.

According to the present invention, a display system is a display system for an electrically powered vehicle. The electrically powered vehicle includes a power storage device and an electric motor. The power storage device stores electric power for traveling. The electric motor receives electric power from the power storage device and generates traveling driving force. Outputtable electric power of the power storage device varies depending on a state of the power storage device (temperature, an SOC and the like). The display system includes a state-of-charge calculating unit and a state-of-charge display. The state-of-charge calculating unit calculates an SOC of the power storage device. The state-of-charge display displays a remaining amount of the SOC above the SOC lower limit ensuring a predetermined minimum traveling performance.

Preferably, the display system further includes a setting unit. The setting unit sets the SOC lower limit ensuring the minimum traveling performance based on a state of the power storage device.

Preferably, the setting unit uses a map prepared in advance and showing a relation between temperature and the SOC of the power storage device ensuring the minimum traveling performance to set the SOC lower limit based on the temperature of the power storage device.

Preferably, the state-of-charge display displays the SOC lower limit set by the setting unit.

Preferably, the state-of-charge display displays a range of the SOC below the lower limit in a manner different from a manner in which a range of the SOC above the lower limit is displayed.

Preferably, the state-of-charge display hides a range of the SOC below the lower limit.

Preferably, the state-of-charge display displays the SOC with a bottom end of a display region for the SOC being the SOC lower limit.

Preferably, the state-of-charge display displays the SOC with a top end of the display region for the SOC being an upper limit of the SOC.

Preferably, the display system further includes a distance calculating unit and a distance display. The distance calculating unit calculates a travelable distance based on the SOC. The distance display displays the travelable distance calculated by the distance calculating unit.

Preferably, the distance calculating unit calculates, based on a remaining amount of the SOC above the SOC lower limit ensuring the minimum traveling performance, the travelable distance for which the minimum traveling performance can be ensured.

Further, according to the present invention, an electrically powered vehicle includes any one of the aforementioned display systems.

The present invention displays a remaining amount of an SOC above the SOC lower limit ensuring a predetermined minimum traveling performance, and therefore a user can recognize an SOC left before reaching a decrease in traveling performance. Consequently, according to the present invention, it is possible to provide a user with information that enables the user to predict a decrease in traveling performance.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
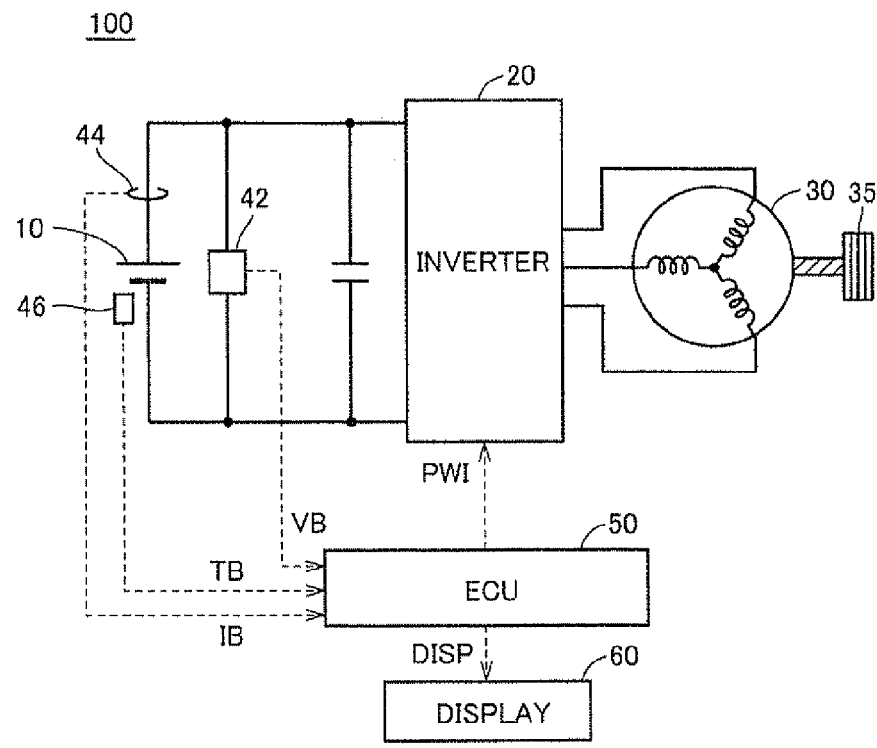
FIG. 1 is an overall block diagram of an electrically powered vehicle according to a first embodiment of the present invention.

Embodiments of the present invention will be described hereinafter in detail with reference to the drawings. In the drawings, the same or corresponding portions have the same reference characters allotted, and description thereof will not be repeated.

First Embodiment

FIG. 1 is an overall block diagram of an electrically powered vehicle according to a first embodiment of the present invention. Referring to FIG. 1, the electrically powered vehicle 100 includes a power storage device 10, an inverter 20, a motor generator 30, and a drive wheel 35. Electrically powered vehicle 100 further includes a voltage sensor 42, a current sensor 44, a temperature sensor 46, an electronic control unit (hereinafter referred to as "ECU") 50, and a display 60.

Power storage device 10 is a DC power supply storing electric power for traveling and configured of, for example, a secondary battery of nickel-metal hydride, lithium ion or the like. Power storage device 10 is charged with the use of a charger not shown in the drawing by a power supply external to the vehicle. Further, during braking of electrically powered vehicle 100 or during reduction in the acceleration on a down slope, power storage device 10 is also charged with electric power generated by motor generator 30 and received from inverter 20. Power storage device 10 outputs stored electric power to inverter 20. The electric power that power storage device 10 can output (hereinafter indicated as "Wont") varies depending on a state of power storage device 10 (such as temperature and an SOC). This will be described later with the drawings.

In accordance with a signal PWI from ECU 50, inverter 20 converts DC power supplied from power storage device 10 into three-phase AC power and outputs it to motor generator 30 to drive motor generator 30. Further, during, for example, braking of electrically powered vehicle 100, in accordance with signal PWI, inverter 20 converts three-phase AC power generated by motor generator 30 into DC power and outputs it to power storage device 10. Inverter 20 is configured of, for example, a three-phase PWM inverter including switching elements for three phases.

Motor generator 30 is a motor generator capable of a power-running operation and a regenerative operation and configured of, for example, a three-phase AC synchronous motor generator with a rotor having a permanent magnet embedded therein. Motor generator 30 is driven by inverter 20 and generates a driving torque for traveling to drive drive wheel 35. Further, during, for example, braking of electrically powered vehicle 100, motor generator 30 receives, from drive wheel 35, the kinetic energy that electrically powered vehicle 100 has and generates electric power.

Voltage sensor 42 detects a voltage VB of power storage device 10 and outputs the detected value to ECU 50. Current sensor 44 detects current IB inputted to or outputted from power storage device 10 and outputs the detected value to ECU 50. Temperature sensor 46 detects temperature TB of power storage device 10 and outputs the detected value to ECU 50.

ECU 50 receives the detected values of voltage VB, current IB and temperature TB from voltage sensor 42, current sensor 44 and temperature sensor 46, respectively. ECU 50 generates a pulse width modulation (PWM) signal for driving inverter 20 and outputs the generated PWM signal to inverter 20 as a signal PWI.

Further, ECU 50 calculates the SOC of power storage device 10 based on detected values of voltage VB and current IB. As a calculation method of an SOC, various known techniques can be used, such as a calculation method using the relation between open circuit voltage (OCV) and SOC of power storage device 10 and a calculation method using an integrated value of current IB.

Further, ECU 50 sets the SOC lower limit capable of ensuring a predetermined minimum traveling performance, based on the state of power storage device 10. More specifically, for electrically powered vehicle 100, for example, the minimum attainable vehicle speed is specified as the minimum traveling performance, while outputtable electric power Wout of power storage device 10 varies depending on the state of power storage device 10 such as temperature TB and an SOC. Accordingly, in electrically powered vehicle 100, the minimum attainable vehicle speed specified as the minimum traveling performance varies depending on the state of power storage device 10. For this reason, ECU 50 sets the SOC lower limit capable of ensuring the minimum attainable vehicle speed, based on temperature TB of power storage device 10. This will be described later in detail.

Further, ECU 50 calculates, based on the SOC capable of ensuring the minimum traveling performance, the travelable distance for which the minimum traveling performance can be ensured. More specifically, in the first embodiment, ECU 50 calculates a distance travelable with an amount of electric power left before reaching the SOC lower limit capable of ensuring the minimum traveling performance (for example, the minimum attainable vehicle speed), rather than a full distance travelable with the electric power actually stored in power storage device 10.

Further, ECU 50 generates a signal DISP for displaying an SOC on display 60 within an SOC range capable of ensuring the minimum traveling performance and for displaying, on display 60, a travelable distance for which the minimum traveling performance can be ensured. Then, ECU 50 outputs the generated signal DISP to display 60 and controls a display state of display 60.

In accordance with signal DISP from ECU 50, display 60 displays an SOC within an SOC range capable of ensuring the minimum traveling performance. Further, in accordance with signal DISP, display 60 displays a travelable distance for which the minimum traveling performance can be ensured.

In electrically powered vehicle 100, electric power stored in power storage device 10 is outputted to inverter 20, and motor generator 30 generates force for driving the vehicle. Here, outputtable power Wout of power storage device 10 varies depending on the state of power storage device 10 (such as temperature and an SOC), and therefore, the traveling performance of the vehicle varies depending on the state of power storage device 10.

For electrically powered vehicle 100, the minimum traveling performance (for example, attainable speed), which is to the extent that does not place a user at any great disadvantage, is specified. Thus, in electrically powered vehicle 100, the SOC lower limit capable of ensuring the minimum traveling performance is set based on the state (temperature) of power storage device 10, and an SOC is displayed on display 60 within an SOC range capable of ensuring the minimum traveling performance. Further, based on the SOC capable of ensuring the minimum traveling performance, a travelable distance for which the minimum traveling performance can be ensured is calculated, and the calculated travelable distance is displayed on display 60 as well.

Figure 2:
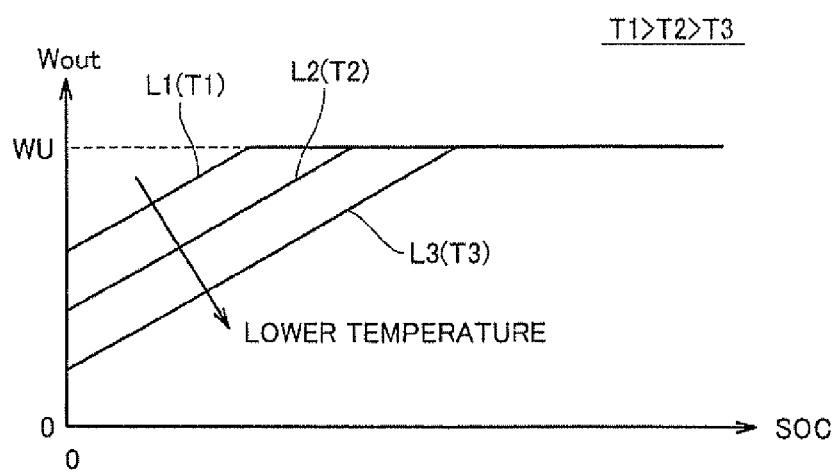
FIG. 2 shows the relation between outputtable electric power and SOC of a power storage device.

FIG. 2 shows the relation between outputtable power Wout and SOC of power storage device 10. Referring to FIG. 2, a line L1 represents outputtable power Wout when temperature TB of power storage device 10 is T1, a line L2 represents outputtable power Wout when temperature TB is T2. Further, line L3 represents outputtable power Wout when temperature TB is T3. It is noted that as to temperatures T1, T2 and T3, T3 is the lowest temperature, followed by T2, then T1.

As shown in FIG. 2, when an SOC decreases, outputtable power Wout decreases. Further, a decrease in the temperature of power storage device 10 also results in a decrease in outputtable power Wout. In this way, outputtable power Wout of power storage device 10 varies depending on the state of power storage device 10.

Figure 3:
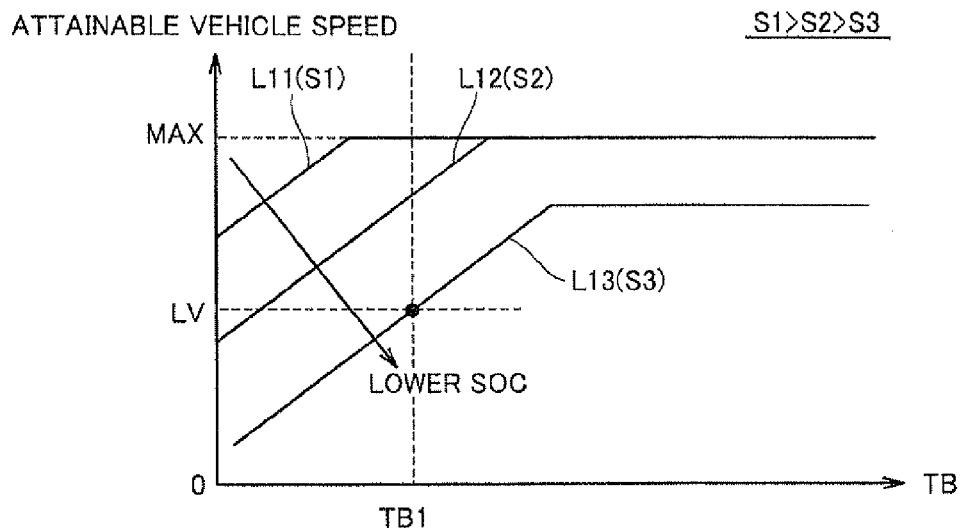
FIG. 3 illustrates variations in travel performance of an electrically powered vehicle.

FIG. 3 illustrates variations in the traveling performance of electrically powered vehicle 100. It is noted that in FIG. 3, attainable vehicle speed (highest vehicle speed) is shown as an example of the traveling performance. Referring to FIG. 3, the vertical axis shows attainable vehicle speed and the horizontal axis shows temperature TB of power storage device 10. A line L11 represents attainable vehicle speed when the SOC of power storage device 10 is S1, a line L12 represents attainable vehicle speed when the SOC is S2. Further, a line L13 represents attainable vehicle speed when the SOC is S3. It is noted that as to S1, S2 and S3, S3 is the lowest SOC, followed by S2, then S1.

As described above, depending on the state of power storage device 10, the traveling performance of the vehicle varies. As such, as shown in FIG. 3, when the temperature of power storage device 10 decreases, the traveling performance of electrically powered vehicle 100 decreases. Further, a decrease in the SOC also results in decrease in traveling performance.

Here, attainable vehicle speed LV shown in the drawing indicates the minimum traveling performance, i.e. the minimum attainable vehicle speed (in other words, being capable of reaching LV at the highest vehicle speed is the minimum traveling performance). Then, for example, when the power storage device has a temperature of TB1, S3 is the SOC lower limit capable of ensuring the minimum traveling performance. It can be seen from FIG. 3 that when the temperature of the power storage device decreases, the SOC lower limit capable of ensuring the minimum traveling performance increases.

Thus, in the first embodiment, the relation between temperature and SOC of power storage device 10 capable of ensuring the minimum traveling performance (here, attainable vehicle speed LV) is prepared in the form of a map or the like in advance, and based on a detected value of temperature TB from temperature sensor 46 (FIG. 1), the SOC lower limit capable of ensuring the minimum traveling performance is set. Then, an SOC is displayed on display 60 within an SOC range capable of ensuring the minimum traveling performance. Further, in the first embodiment, based on the SOC capable of ensuring the minimum traveling performance, a travelable distance for which the minimum traveling performance can be ensured is calculated, and the calculated travelable distance is also displayed on display 60.

Figure 4:
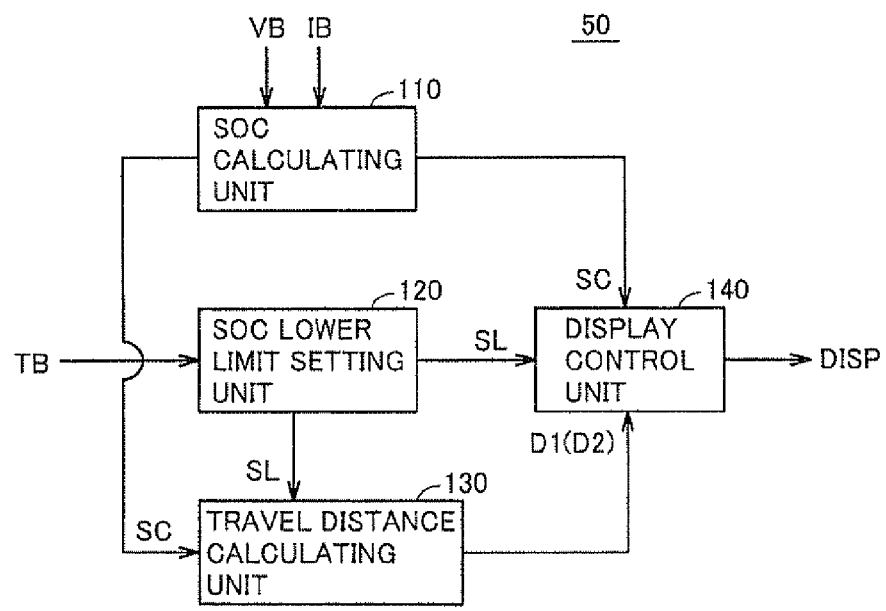
FIG. 4 is a functional block diagram of an ECU shown in FIG. 1.

FIG. 4 is a functional block diagram of ECU 50 shown in FIG. 1. It is noted that FIG. 4 shows only the part of functions that relates to display control of display 60. Referring to FIG. 4, ECU 50 includes an SOC calculating unit 110, an SOC lower limit setting unit 120, a travel distance calculating unit 130, and a display control unit 140.

SOC calculating unit 110 calculates the SOC of power storage device 10 based on detected values of voltage VB and current IB of power storage device 10, and outputs the calculated value SC to travel distance calculating unit 130 and display control unit 140. It is noted that for calculating an SOC, various known techniques can be used, such as the calculation method using the relation between OCV and SOC of power storage device 10 and the calculation method using an integrated value of current IB.

Based on a detected value of temperature TB of power storage device 10, SOC lower limit setting unit 120 sets the SOC lower limit capable of ensuring the minimum traveling performance (for example, attainable vehicle speed LV shown in FIG. 3). Specifically, the relation between temperature and SOC of the power storage device and the traveling performance of the vehicle as shown in FIG. 3 is used to map, in advance, the relation between temperature and SOC of power storage device 10 when the minimum traveling performance (for example, attainable vehicle speed LV) is met. Then the map can be used to set, based on a detected value of temperature TB of power storage device 10, the SOC lower limit value SL capable of ensuring the minimum traveling performance.

Based on a calculated SOC value SC calculated by SOC calculating unit 110 and SOC lower limit value SL set by SOC lower limit setting unit 120, travel distance calculating unit 130 calculates a travelable distance D1 for which the minimum traveling performance can be ensured. For example, travelable distance D1 can be calculated by the following expression:

$$D1 = (SC - SL)/100 \times C \times k \times V/\text{electric mileage} \quad (1)$$

where, C represents capacity (Ah) of power storage device 10, k represents a coefficient of deterioration of power storage device 10. Further, V represents a voltage of power storage device 10 and electric mileage (Wh/km) represents electricity consumption per unit travel distance.

Display control unit 140 receives SOC calculated value SC, SOC lower limit value SL and travelable distance D1, and generates signal DISP for displaying each of these values on display 60 (FIG. 1). Then, display control unit 140 outputs generated signal DISP to display 60.

Figure 5:
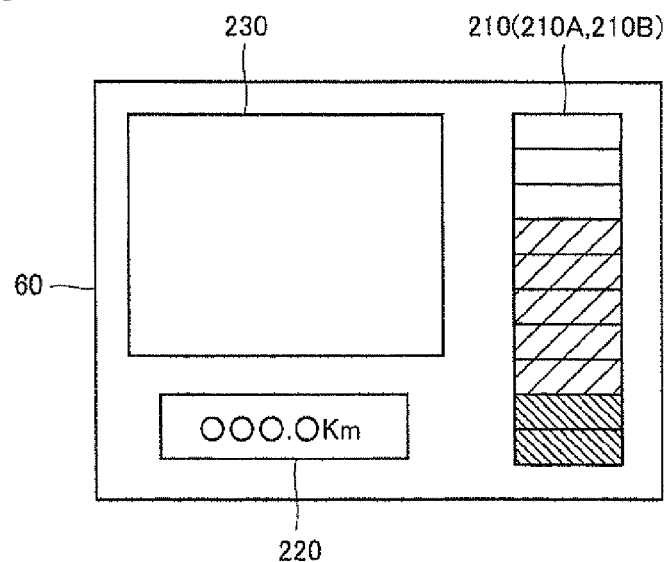
FIG. 5 shows an example of a manner in which a display shown in FIG. 1 displays.

FIG. 5 shows an example of a manner in which display 60 shown in FIG. 1 displays. Referring to FIG. 5, display 60 includes an SOC display 210, a travel distance display 220 and an information display 230.

SOC display 210 displays the SOC of power storage device 10. In one example, SOC display 210 includes a plurality of display segments arrayed consecutively and displays an SOC by the corresponding number of lighted display segments. In accordance with signal DISP from ECU 50, SOC display 210 displays the SOC of power storage device 10 within an SOC range capable of ensuring the minimum traveling performance. Specifically, SOC display 210 displays an SOC within a range above SOC lower limit value SL set by SOC lower limit setting unit 120 of ECU 50 (FIG. 4). A detailed description of a manner in which SOC display 210 displays will be given later.

In accordance with signal DISP from ECU 50, travel distance display 220 displays travelable distance D1 calculated by travel distance calculating unit 130 of ECU 50 (FIG. 4). That is, travel distance display 220 displays a travel distance for which the minimum traveling performance can be ensured. Information display 230 displays various information of which a user should be notified.

Figure 6:
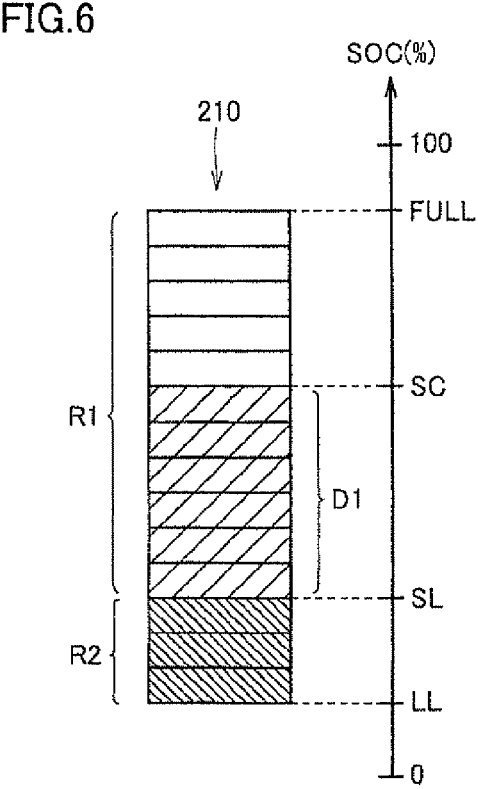
FIG. 6 illustrates a manner in which an SOC display shown in FIG. 5 displays.

FIG. 6 illustrates a manner in which SOC display 210 shown in FIG. 5 displays. Referring to FIG. 6, an axis shown along SOC display 210 is to indicate, relative to an SOC presented on SOC display 210, an actual SOC on a number line, and will not actually be displayed on display 60.

The upper display limit of SOC display 210 corresponds to the upper limit value FULL equivalent to a fully charged state, while the lower display limit corresponds to the lowest limit value LL of SOC. A display region of SOC display 210 can be divided into a region R1 and a region R2. The boundary between regions R1 and R2 corresponds to the SOC lower limit capable of ensuring the minimum traveling performance (SOC lower limit value SL). That is, SOC display 210 divides the display region into regions R1 and R2, thereby displaying the SOC lower limit capable of ensuring the minimum traveling performance.

Region R1 is a display region for an SOC. Specifically, region R1 is an SOC range capable of ensuring the minimum traveling performance, and an SOC is displayed within this range. Region R2 is an SOC range incapable of ensuring the minimum traveling performance. Region R2 is displayed in a manner different from SOC display in region R1, or region R2 is hidden.

It is noted that in the first embodiment, travelable distance D1, which is calculated based on a remaining SOC amount (SC−SL) capable of ensuring the minimum traveling performance, is displayed on travel distance display 220 of display 60 (FIG. 5).

As such, in the first embodiment, an SOC is displayed within an SOC range capable of ensuring a predetermined minimum traveling performance (region R1 in FIG. 6), and therefore, a user can recognize an SOC left before reaching a decrease in traveling performance. Thus, according to the first embodiment, it is possible to provide a user with information that enables the user to predict a decrease in traveling performance.

Further, in the first embodiment, the SOC lower limit capable of ensuring the minimum traveling performance (SOC lower limit value SL) is set based on the state of power storage device 10. Then, the set lower limit of SOC is displayed on SOC display 210 as the boundary between regions R1 and R2. Thus, according to the first embodiment, the SOC lower limit capable of ensuring the minimum traveling performance can be made available to a user in accordance with the state of power storage device 10.

Modification of First Embodiment

In the first embodiment above, a travelable distance for which the minimum traveling performance can be ensured is displayed in travel distance display 220 shown in FIG. 5. As to display of travelable distance, however, a travelable distance, regardless of whether the minimum traveling performance can be maintained or not for the distance, may be displayed on travel distance display 220.

Figure 7:
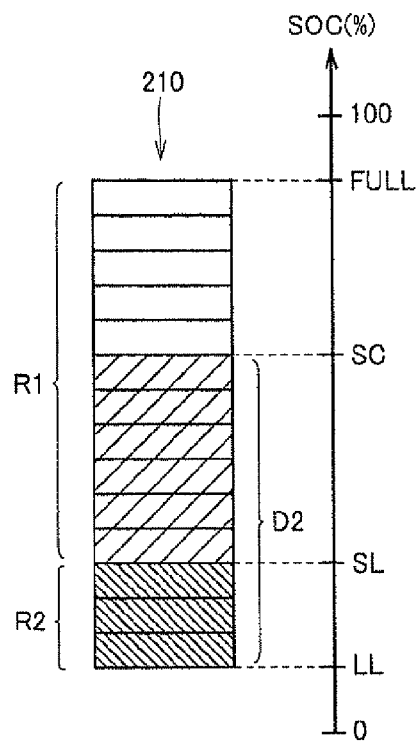
FIG. 7 illustrates a manner in which an SOC display of a display in a modification of the first embodiment displays.

That is, as shown in FIG. 7, in this modification, a travelable distance D2 for which the vehicle can travel and which is based on a remaining SOC amount (SC−LL) is displayed on travel distance display 220 of display 60 (FIG. 5). Travelable distance D2 is calculated by travel distance calculating unit 130 (FIG. 4) by the following expression:

$$D2=(SC-LL)/100 \times C \times k \times V/\text{electric mileage} \qquad (2)$$

where LL represents the SOC lowest limit value allowing power storage device 10 to output electric power.

It is noted that although not shown in the drawings in particular, display on travel distance display 220 may be switchable by a user between travelable distance D1 for which the minimum traveling performance can be ensured and travelable distance D2 above.

Second Embodiment

In a second embodiment, display 60 has an SOC display which displays in a manner different from that in the first embodiment.

Figure 8:
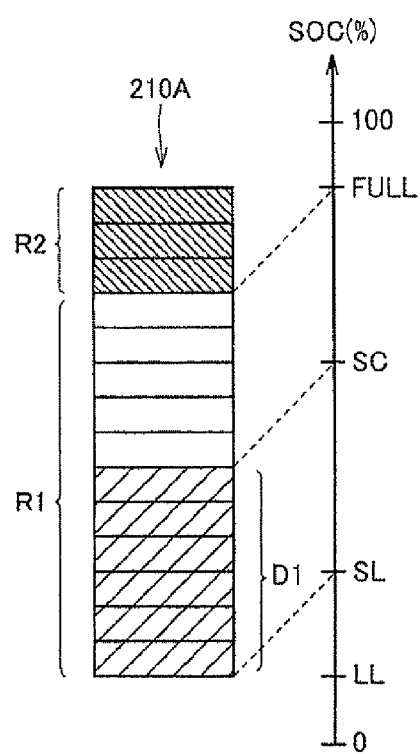
FIG. 8 shows a manner in which an SOC display of a display in a second embodiment displays.

FIG. 8 shows a manner in which an SOC display 210A of display 60 in the second embodiment displays. Referring to FIG. 8, SOC display 210A displays an SOC with the bottom end of a display region being the SOC lower limit capable of ensuring the minimum traveling performance (SOC lower limit value SL). Consequently, a remaining SOC amount capable of ensuring the minimum traveling performance is made available to a user in a more readily visible form.

Further, in SOC display 210A, region R2 shown in FIGS. 6 and 7 is provided on the upper limit side of region R1. That is, the manner in which SOC display 210A displays corresponds to that of SOC display 210 in the first embodiment where regions R1 and R2 are interchanged. It is noted that region R2 may be displayed in a manner different from SOC display in region R1, or region R2 may be hidden.

It is noted that other configuration of the electrically powered vehicle according to the second embodiment is the same as that of electrically powered vehicle 100 according to the first embodiment shown in FIG. 1.

According to the second embodiment, a remaining SOC amount capable of ensuring the minimum traveling performance can be made available to a user in a more readily visible form.

Third Embodiment

In a third embodiment, display 60 also has an SOC display which displays in a manner different from that in the first embodiment.

Figure 9:
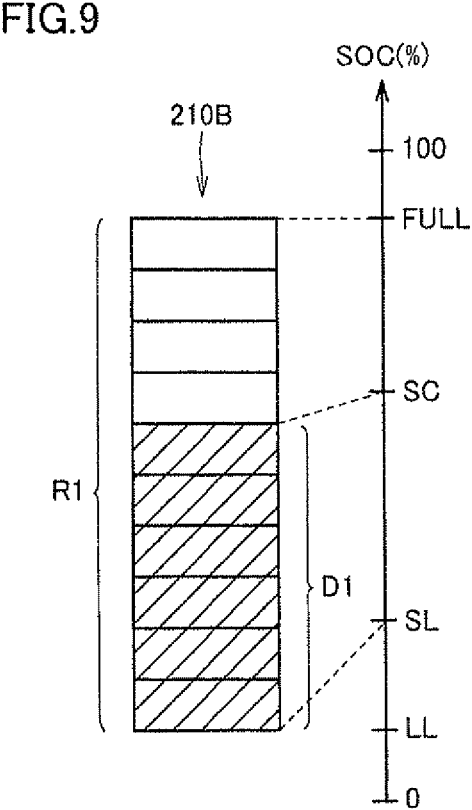
FIG. 9 shows a manner in which an SOC display of a display in a third embodiment displays.

FIG. 9 shows a manner in which an SOC display 210B of display 60 in the third embodiment displays. Referring to FIG. 9, as with SOC display 210A in the second embodiment, SOC display 210B also displays an SOC with the bottom end of a display region being the SOC lower limit capable of ensuring the minimum traveling performance (SOC lower limit value SL).

Further, in SOC display 210B, the top end of the display region is upper limit value FULL equivalent to a fully charged state. That is, in the third embodiment, only region R1 presenting an SOC range capable of ensuring the minimum traveling performance is displayed on SOC display 210B, while region R2 in which the minimum traveling performance cannot be ensured is hidden from SOC display 210B. Then, a range of SOC from SOC lower limit value SL to upper limit value FULL is displayed in an enlarged manner between the bottom and top ends of SOC display 210B.

It is noted that other configuration of the electrically powered vehicle according to the third embodiment is the same as that of electrically powered vehicle 100 according to the first embodiment shown in FIG. 1.

According to the third embodiment, only a remaining SOC amount capable of ensuring the minimum traveling performance is made available to a user. Thus, a user can more accurately recognize an SOC left before reaching a decrease in traveling performance.

It is noted that in the embodiments above, SOC displays 210, 210A and 210B have been described as lighting display segments thereby displaying an SOC, however, they may use a movable needle or the like instead of the display segments, to display an SOC. Further, SOC display 210 has been described as dividing a display region into regions R1 and R2, thereby displaying the SOC lower limit capable of ensuring the minimum traveling performance (SOC lower limit value SL), however, it may use a movable needle or the like to directly display SOC lower limit value SL.

Further, in the above, attainable vehicle speed is used to describe an indicator of traveling performance of the vehicle, however, an index of traveling performance is not limited to attainable vehicle speed, and may be an outputtable torque, for example.

Furthermore, in the embodiments above, electric power outputted from power storage device 10 is described as being directly supplied to inverter 20. The present invention is, however, applicable to an electrically powered vehicle in which a boost converter is provided between power storage device 10 and inverter 20.

Still further, the present invention is also applicable to a hybrid vehicle equipped with an engine in addition to motor generator 30. It is noted that with a hybrid vehicle, the present invention is particularly preferable in an EV travel mode in which the engine is stopped and electric power from a power storage device is used to travel with the motor generator only.

It is noted that in the above, motor generator 30 corresponds to an embodiment of "electric motor" in the present invention, and SOC calculating unit 110 corresponds to an embodiment of "state-of-charge calculating unit" in the present invention. Further, SOC displays 210, 210A and 210B of display 60 correspond to an embodiment of "state-of-charge display" in the present invention, and SOC lower limit setting unit 120 corresponds to an embodiment of "setting unit" in the present invention. Furthermore, travel distance calculating unit 130 corresponds to an embodiment of "distance calculating unit" in the present invention, and travel distance display 220 of display 60 corresponds to "distance display" in the present invention.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A display system for an electrically powered vehicle, the electrically powered vehicle including: a power storage device storing electric power for traveling; and an electric motor receiving electric power from said power storage device and generating traveling driving force, outputtable electric power of said power storage device varying depending on a state of said power storage device, said display system comprising:
 a state-of-charge calculating unit calculating a state of charge of said power storage device;
 a state-of-charge display displaying a remaining amount of said state of charge above a lower limit of said state of charge, said lower limit of said state of charge ensuring a predetermined minimum traveling performance;
 a distance calculating unit calculating a travelable distance based on said remaining amount of said state of charge above said lower limit, said lower limit ensuring a predetermined minimum traveling performance; and
 a distance display displaying said travelable distance, wherein the display system further comprises a setting unit that sets said lower limit based on a state of said power storage device, and said state-of-charge display displays said lower limit set by said setting unit.

2. The display system according to claim 1, wherein said setting unit uses a map prepared in advance and that shows a relation between temperature and said state of charge of said power storage device ensuring said minimum traveling performance to set said lower limit based on the temperature of said power storage device.

3. The display system according to claim 1, wherein said state-of-charge display displays a range of said state of charge below said lower limit in a manner different from a manner in which a range of said state of charge above said lower limit is displayed.

4. The display system according to claim 1, wherein said state-of-charge display hides a range of said state of charge below said lower limit.

5. The display system according to claim 1, wherein said state-of-charge display displays said state of charge with a bottom end of a display region for said state of charge being said lower limit.

6. The display system according to claim 5, wherein said state-of-charge display displays said state of charge with a top end of the display region for said state of charge being an upper limit of said state of charge.

7. An electrically powered vehicle comprising a display system according to claim 1.

* * * * *